(12) United States Patent
Burch et al.

(10) Patent No.: US 9,722,984 B2
(45) Date of Patent: Aug. 1, 2017

(54) PROXIMITY-BASED AUTHENTICATION

(71) Applicant: Novell, Inc., Provo, UT (US)

(72) Inventors: Lloyd Leon Burch, Payson, UT (US); Michael F. Angelo, Spring, TX (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 23 days.

(21) Appl. No.: 14/168,223

(22) Filed: Jan. 30, 2014

(65) Prior Publication Data
US 2015/0215299 A1 Jul. 30, 2015

(51) Int. Cl.
*H04L 29/06* (2006.01)
*H04W 12/06* (2009.01)

(52) U.S. Cl.
CPC .......... *H04L 63/08* (2013.01); *H04L 63/0853* (2013.01); *H04L 63/18* (2013.01); *H04W 12/06* (2013.01)

(58) Field of Classification Search
CPC ......... H04L 9/32; H04L 63/08; H04L 63/083; H04L 63/18; G06F 21/00; H04W 12/06
USPC ...................... 726/1, 5, 28, 16; 713/182, 184
See application file for complete search history.

(56) References Cited

U.S. PATENT DOCUMENTS

| | | | |
|---|---|---|---|
| 5,520,544 A * | 5/1996 | Manico ................. | G09B 5/062 281/31 |
| 6,940,977 B1 | 9/2005 | Manabe | |
| 7,251,730 B2 | 7/2007 | Rose et al. | |
| 7,254,708 B2 | 8/2007 | Silvester | |
| 7,378,939 B2 | 5/2008 | Sengupta et al. | |
| 7,398,394 B1 * | 7/2008 | Johnsen ................. | H04L 63/08 713/150 |
| 7,516,325 B2 * | 4/2009 | Willey ................ | H04L 63/0492 713/168 |
| 7,624,267 B2 * | 11/2009 | Huang .................. | H04L 9/0822 380/229 |
| 7,966,497 B2 * | 6/2011 | Gantman ........... | G06Q 20/3272 380/255 |
| 8,151,326 B2 | 4/2012 | Brown | |
| 8,333,317 B2 | 12/2012 | Buer et al. | |
| 8,356,179 B2 * | 1/2013 | Tie ......................... | H04L 9/3213 713/155 |
| 8,401,194 B2 * | 3/2013 | Nierzwick ............ | H04L 63/061 380/270 |
| 8,462,961 B1 * | 6/2013 | Bywaters ............ | H04L 12/1895 381/77 |
| 8,595,810 B1 * | 11/2013 | Ben Ayed ........... | H04L 63/0815 713/168 |
| 2003/0065918 A1 * | 4/2003 | Willey ................ | H04L 63/0492 713/168 |
| 2003/0172271 A1 | 9/2003 | Silvester | |

(Continued)

*Primary Examiner* — Abu Sholeman
(74) *Attorney, Agent, or Firm* — Schwegman Lundberg & Woessner, P.A.

(57) ABSTRACT

A first device requests a protected resource (managed by a second device). A first authentication is performed by the second device upon receipt of the request. The second device provides an audio message back to the first device, which plays the audio message over a speaker. A third device captures the audio message as audio and uses the audio message to request a second authentication from the second device. The second device provides an authenticated session handle back to the first device for accessing the protected resource when both the first and second authentications are successful.

3 Claims, 8 Drawing Sheets

(56) References Cited

U.S. PATENT DOCUMENTS

| | | | |
|---|---|---|---|
| 2006/0053298 A1* | 3/2006 | Ingerman | G06F 21/34 713/182 |
| 2006/0143458 A1* | 6/2006 | Tie | H04L 63/0823 713/176 |
| 2007/0143624 A1* | 6/2007 | Steeves | G06F 21/36 713/182 |
| 2007/0192849 A1* | 8/2007 | Golle | G06F 21/34 726/16 |
| 2007/0204042 A1 | 8/2007 | Noble | |
| 2009/0116703 A1* | 5/2009 | Schultz | G06F 21/32 382/118 |
| 2010/0228804 A1* | 9/2010 | Dasgupta | G06F 17/30864 345/557 |
| 2010/0281261 A1* | 11/2010 | Razzell | H04L 63/0492 713/171 |
| 2010/0293604 A1* | 11/2010 | Nanda | G06F 21/6218 726/5 |
| 2010/0318669 A1* | 12/2010 | Chugh | G06F 21/36 709/229 |
| 2012/0056490 A1* | 3/2012 | Bruwer | H05B 37/02 307/116 |
| 2012/0084364 A1* | 4/2012 | Sivakeesar | H04L 12/1818 709/205 |
| 2012/0140993 A1* | 6/2012 | Bruso | G06K 9/00899 382/118 |
| 2012/0144198 A1* | 6/2012 | Har | H04L 63/0869 713/170 |
| 2012/0179538 A1* | 7/2012 | Hines | G06Q 30/0242 705/14.43 |
| 2012/0253814 A1* | 10/2012 | Wang | G06F 17/30905 704/260 |
| 2012/0257051 A1* | 10/2012 | Cheng | H04N 7/18 348/143 |
| 2012/0297413 A1* | 11/2012 | Choi | H04N 21/25816 725/25 |
| 2013/0010962 A1 | 1/2013 | Buer et al. | |
| 2013/0031641 A1* | 1/2013 | Fisk | G06F 21/31 726/28 |
| 2013/0036342 A1* | 2/2013 | Deo | G06Q 30/02 715/202 |
| 2013/0160095 A1* | 6/2013 | Seleznyov | G06F 21/36 726/5 |
| 2013/0191637 A1 | 7/2013 | Smaak et al. | |
| 2013/0216027 A1* | 8/2013 | Rados | H04M 3/51 379/32.01 |
| 2013/0232543 A1* | 9/2013 | Cheng | G06F 21/6218 726/1 |
| 2014/0112483 A1* | 4/2014 | Etter | H03G 3/3005 381/56 |
| 2014/0129231 A1* | 5/2014 | Herring | G10L 25/51 704/270.1 |
| 2014/0130143 A1* | 5/2014 | Choi | H04L 63/0853 726/7 |
| 2014/0181938 A1* | 6/2014 | Hrybyk | H04L 63/083 726/7 |
| 2014/0250502 A1* | 9/2014 | Lauer | G06F 21/36 726/5 |
| 2014/0273987 A1* | 9/2014 | Price | H04L 51/12 455/414.1 |
| 2015/0120549 A1* | 4/2015 | Khalid | G06Q 20/4014 705/44 |
| 2015/0128216 A1* | 5/2015 | Rolls, IV. | H04W 12/06 726/3 |
| 2015/0161370 A1* | 6/2015 | North | G07C 9/00158 726/5 |
| 2015/0180829 A1* | 6/2015 | Yu | G06F 21/31 726/11 |
| 2015/0215299 A1* | 7/2015 | Burch | H04L 63/08 726/5 |
| 2015/0326716 A1* | 11/2015 | Figa | H04W 4/12 379/215.01 |
| 2015/0347734 A1* | 12/2015 | Beigi | G06F 21/32 713/155 |
| 2015/0381369 A1* | 12/2015 | Broumas | H04L 9/3228 713/176 |
| 2016/0098870 A1* | 4/2016 | Bergerhoff | G07C 9/00007 340/5.61 |
| 2016/0261411 A1* | 9/2016 | Yau | H04W 4/008 |

* cited by examiner

PROXIMITY-BASED AUTHENTICATION

BACKGROUND

As the Internet grows ever larger, the need for stronger authentication becomes more important. Name and password authentication mechanisms are not providing the total needed level of user validation. As a result, and in many instances, multifactor authentication is being used in the industry to fill this need for stronger authentication. However, the problem with most multifactor authentication mechanisms is that they require more interaction (input or attention) from the end user. Moreover, each time data entry is required from the user, errors are introduced and the solution becomes appealing to the end user.

Multifactor authentication is typically provided with at least two of three authentication factors. The three factors are: 1) "what you know," 2) "what you are," and 3 "what you have." Name and password credentials are a case of "what you know" (1). Furthermore, there are many hardware devices that are used to fill the need of, "what you have" (3). The problem with hardware devices providing "what you have" (3) is that the hardware devices require the end user to carry another device, such as hardware tokens. The problem that can be solved by an end user using his/her mobile device (iPad®, iPhone®, Android, etc.) as a hardware token, but this actually causes yet another problem. Specifically, the end user must have special hardware and/or software on his/her desktop to interface with his/her mobile device (hardware), or he/she must provide information read from the desktop screen into the mobile device. This means that the end user must first type in his/her name and password into the desktop; then read a "challenge" presented on the screen; type an answer to the "challenge" into the mobile device; read the response on the mobile device; and then type the response into the desktop interface as an appropriate response. In some situations, processing steps can be removed but not all of the steps can be removed with the current-state of technology. Essentially, the end user is the go-between of the mobile device and the login prompt of the desktop interface.

Moreover, at no point in time is there any assurance that the mobile device of the end user is in close proximity to the desktop with the above-discussed scenario. The response to the "challenge question" sent from the desktop interface to the mobile device can be remotely provided to someone at the desktop, who may not even be the end user.

SUMMARY

Various embodiments of the invention provide techniques for proximity-based authentication. In an embodiment, a method for proximity-based authentication is presented.

Specifically, an audio message is sent to a device. Next, a response message is received in response to the audio message that was sent to the device. Finally, a determination is made to whether or not to provide the device access to a resource based on evaluation of the audio message and the response message.

DETAILED DESCRIPTION

Figure 1A:
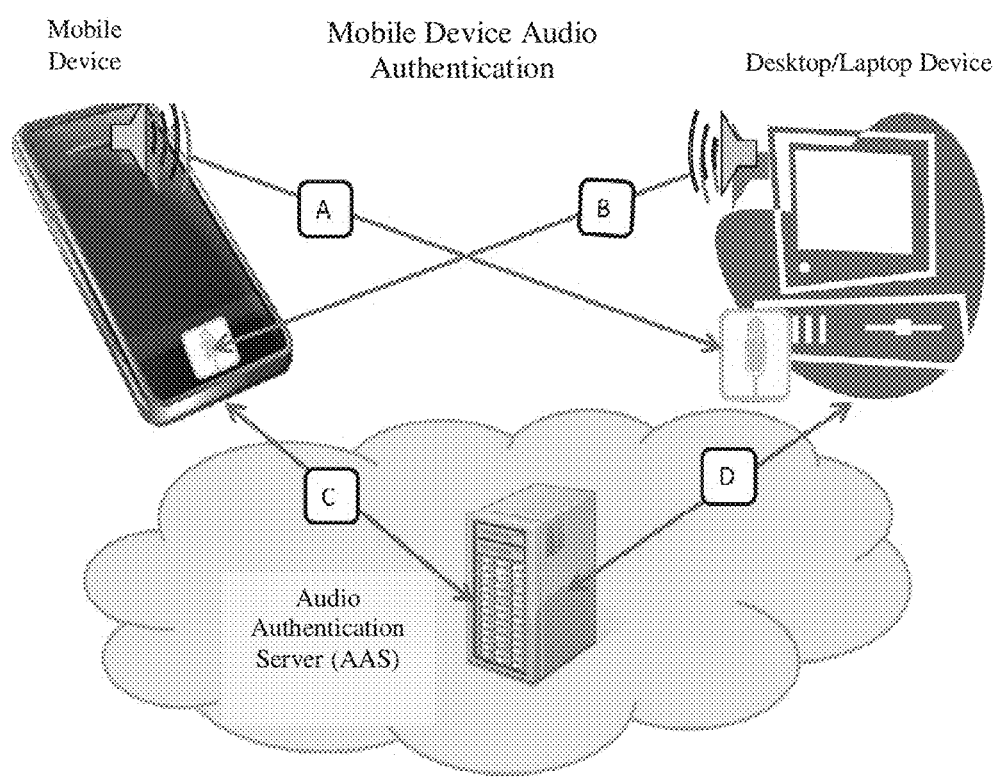
FIGS. 1A-1E are flow diagrams depicting architectures and processing for proximity-based authentication, according to an example embodiment presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1E and 2-4.

Figure 1B:
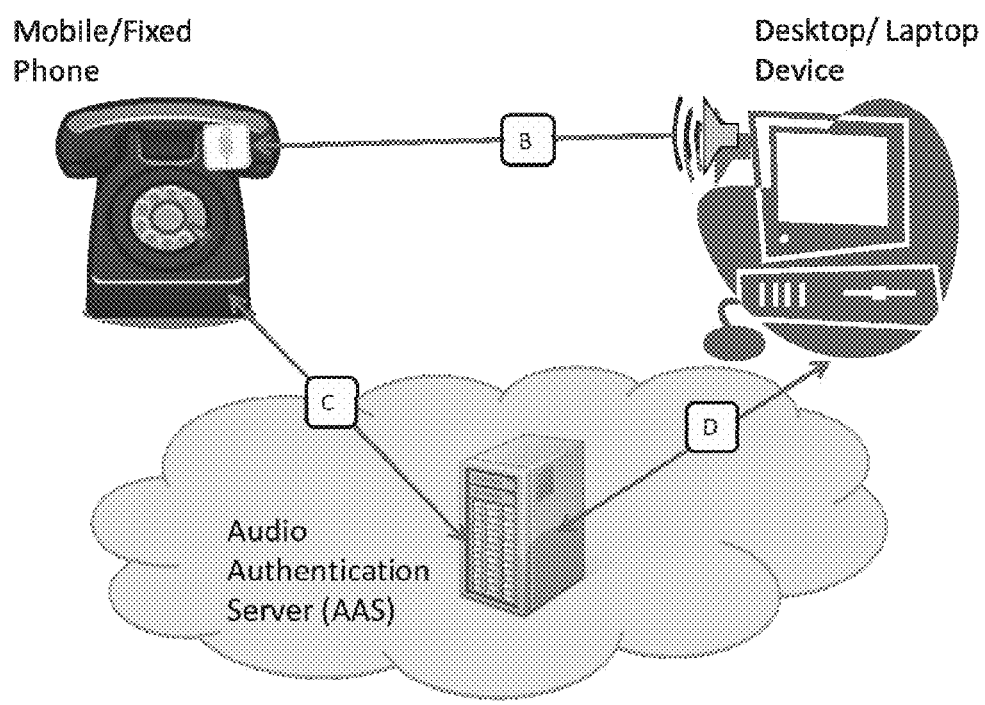

FIGS. 1A-1E are flow diagrams depicting architectures and processing for proximity-based authentication, according to an example embodiment presented herein. The FIGS. 1A-1B depict example architectures for performing multifactor authentication among a mobile device (mobile phone in the FIG. 1B and a fixed landline phone in the FIG. 1B), a desktop device (such as a desktop computer), and a server (can be a cloud);

These architectures FIG. 1A-1B are shown for purposes of illustration of particular embodiments of the invention; it is noted that other embodiments of the invention (FIGS. 2-4) need not be limited to these architectures FIGS. 1A-1B, as other hardware and software architectures can be used as well.

The FIG. 1A depicts an architecture for mobile device audio authentication. The architecture includes a mobile device (smart phone or phone but is not so limited (because the mobile device can also be a tablet, a wearable processing device, a laptop, etc.), a desktop device (computer), and an Audio Authentication Server (AAS).

The FIG. 1B depicts another architecture for phone-based authentication. The architecture includes a fixed phone (landline), a laptop, and an AAS.

Figure 1C:
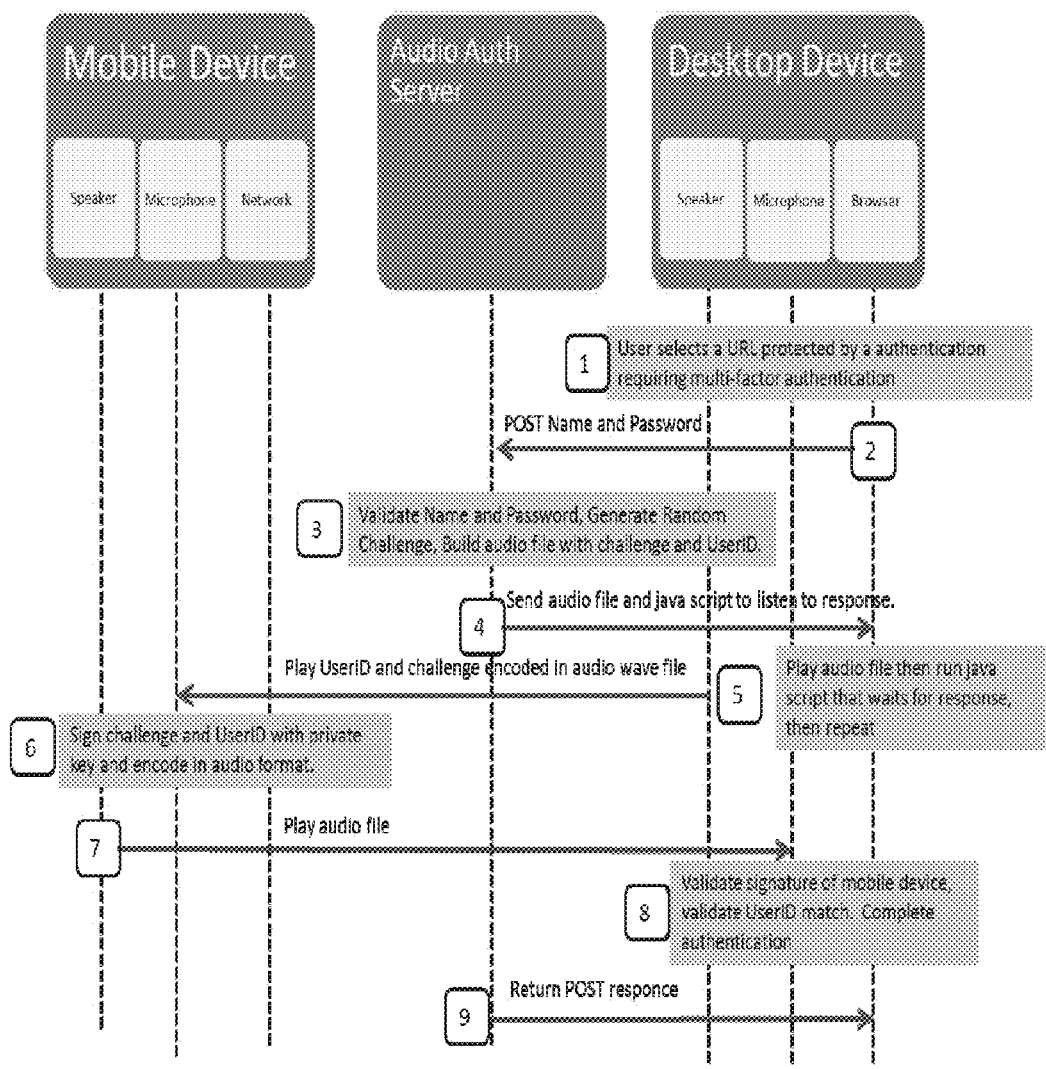

The FIG. 1C depicts a processing flow for various aspects of the invention utilizing the architecture 1A. The processing flow is discussed within the context of an end user attempting to authenticate via a multifactor proximity-based authentication technique.

The end-user visits a protected resource (requiring multifactor authentication) using an interface, such as a browser-based interface of the computer (can be a laptop or tablet as well). The request for the protected resource is redirected to the AAS for initiating and performing the multifactor authentication. The user is prompted for his/her user name and password ("what the user knows" and first part of the multifactor authentication). The remaining portion of the multifactor authentication is performed automatically on behalf of the user, without any user interaction being required.

The mobile device is initially configured to execute an application (mobile app) on the processor(s) of the mobile device and residing in and programmed within memory and/or non-transitory computer-readable storage media of the mobile device. The mobile app can execute in the foreground or background of the mobile device.

Moreover, the mobile device is already registered with the AAS for use of the multifactor audio authentication approach (discussed below). As part of the registration process, the mobile device has a Public Key Infrastructure (PKI) key pair (public and private) stored in memory and/or storage of the mobile device. The public key of the key pair is shared with the AAS.

The AAS is initially configured to use a secure protocol for communication, such as Secure Socket Layer (SSL) and/or Transport Layer Security (TLS).

Now, reference is made to the FIG. 1C to discuss the mobile audio multifactor authentication within the context of a user at a desktop and having a phone (mobile device).

At 1 (of the FIG. 1C), the end user (user) is interacting with the desktop device (which, minimally, includes a speaker, a microphone, and a browser interface (browser)) and selects (via the browser) a Uniform Resource Locator (URL) link associated with a protected resource. Again, the protected resource is associated with a policy that necessitates multifactor authentication before access is permitted to the user. For example, an administrator may have configured the protected resource to require multifactor authentication for access. In another case, a dynamic service can determine when the user selects the protected resource that multifactor authentication is required based on an identity of the protected resource and/or an identity for the user.

In the present example, the two factors required for the multifactor authentication are: 1) a name and password pair for the user; and 2) the information discussed below.

At 2, the browser uses a Hypertext Markup Language (HTML) form to get the name and password from the user, which is then sent to the AAS as a POST.

At 3, the AAS validates the name and password from the user (such as, via a Lightweight Directory Access Protocol (LDAP) mechanism, or other mechanisms). Then, the AAS generates a challenge string. In an embodiment, the string is randomly generated so that it cannot be predicted. The challenge string and user identification (user ID acquired from the validated name and password of the user) are encoded into an audio format. This audio encoding can be achieved via existing mechanisms available on modems and other devices.

At 4, the AAS returns an HTML page to the browser (of the desktop device); the HTML page includes an authentication application or a script (such as a JAVA™ script, or other script), and the HTML page also includes an audio file that the browser is to play to generate sound on the speaker of the desktop device.

At 5, the application or script begins to play the audio file sent and then listens for a reply by monitoring the microphone of the desktop device. The processing at 5 can be repeated multiple times until a timeout is detected by the desktop device. The number of iterations before a timeout occurs can be preconfigured, provided as an operating parameter, or be based on a predefined elapsed period of time.

At 6, the mobile application of the mobile device "hears" the sound generated from the speaker of the desktop device by monitoring the microphone of the mobile device and decodes the challenge string and user ID embedded in the audio stream detected over the microphone of the mobile device. The challenge string and the user ID are then signed by the private key of the mobile device (the public key of the mobile device previously registered with the AAS). In an embodiment, a policy evaluated by the mobile application may also require that the mobile application encrypt the signed challenge string and user ID. In an embodiment and for added security, another policy may necessitate that the mobile application prompt the user on the mobile device, via an interface of the mobile application, for the user to supply some additional code, such as a Personal Identification Number (PIN). The signed, and optionally encrypted, challenge string and user ID are encoded into an audio file.

At 7, the mobile application of the mobile device sends the audio file that it produced in 6 by playing the audio file on a speaker of the mobile device, which is received at the speaker of the desktop device (which the desktop device is monitoring for a reply in 5 above, via the microphone of the desktop device).

At 8, the desktop device demodulates the signed, and optionally encrypted, audio file being streamed as audio from the mobile device. In an embodiment, the desktop device just captures and records the audio stream.

At 9, the desktop device sends the captured or demodulated audio stream as a POST to the AAS for validation.

Assuming, the AAS can successfully validate the captured or demodulated audio stream using the public key of the mobile device, the AAS returns an authentication session handle back to the browser of the desktop device for the user to access the protected resource (process originated at 1—as a response to the original POST message sent from the browser).

The above-noted embodiment utilized multifactor authentication in which a desktop device and a mobile device each utilized their respective speakers and microphones to perform that audio authentication. The FIG. 1D depicts an embodiment in which a microphone on the desktop device is not used and in which a speaker on the mobile device is not used.

Figure 1D:
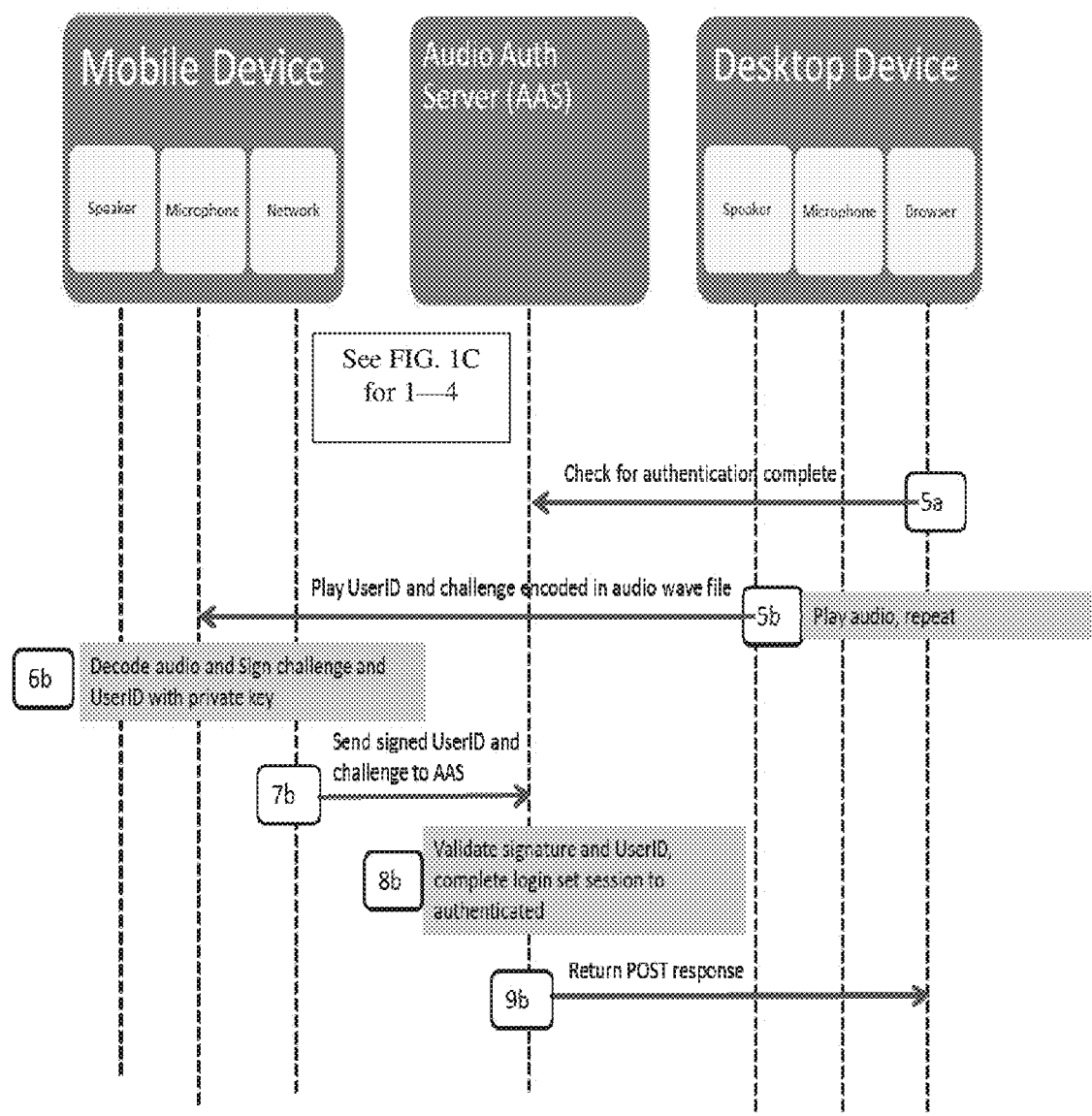

The processing for the embodiment of the FIG. 1D includes the processing 1-4 depicted in the FIG. 1C. However, the remaining processing of the FIG. 1C (beginning at 5) is different.

Specifically, at 5a, the desktop device makes a check to the AAS to determine if authentication of the user name and password verification completed. If so, at 5b, the desktop device begins playing the audio file (as described above) out of the speaker of the desktop device with the user ID and challenge encoded in the audio stream (may also be referred to as an "audio message"). The audio message is again repeated until completed (multifactor authentication confirmed with a session handle returned to the browser from the AAS), halted manually by the user (using the browser or an interface of the mobile application), or a timeout is detected (as discussed above at 5 with the discussion of the FIG. 1C).

At 6b, the mobile application of the mobile device detects, via the mobile device's microphone, the audio message and decodes it. The challenge string and user ID embedded in the decoded audio message are signed using the private key of the mobile device. Again, and optionally, the signed decoded challenge string and user ID may also be encrypted. Similarly, an interface of the mobile application may require the user manually enter a code, such as a PIN to proceed at this point.

At 7b, the mobile application sends the signed, and optionally encrypted, audio message to the AAS using a secure protocol, such as SSL or TLS.

At 8b, the AAS validates the signed, and optionally encrypted, audio message using the public key of the mobile device and initially signed with the private key of the mobile device.

Assuming, authentication is successful the AAS returns a valid session handle (session identifier) to the browser of the desktop device for the user to access the protected resource. In an embodiment, the session handle is returned as a response to the original POST issued by the browser.

Figure 1E:
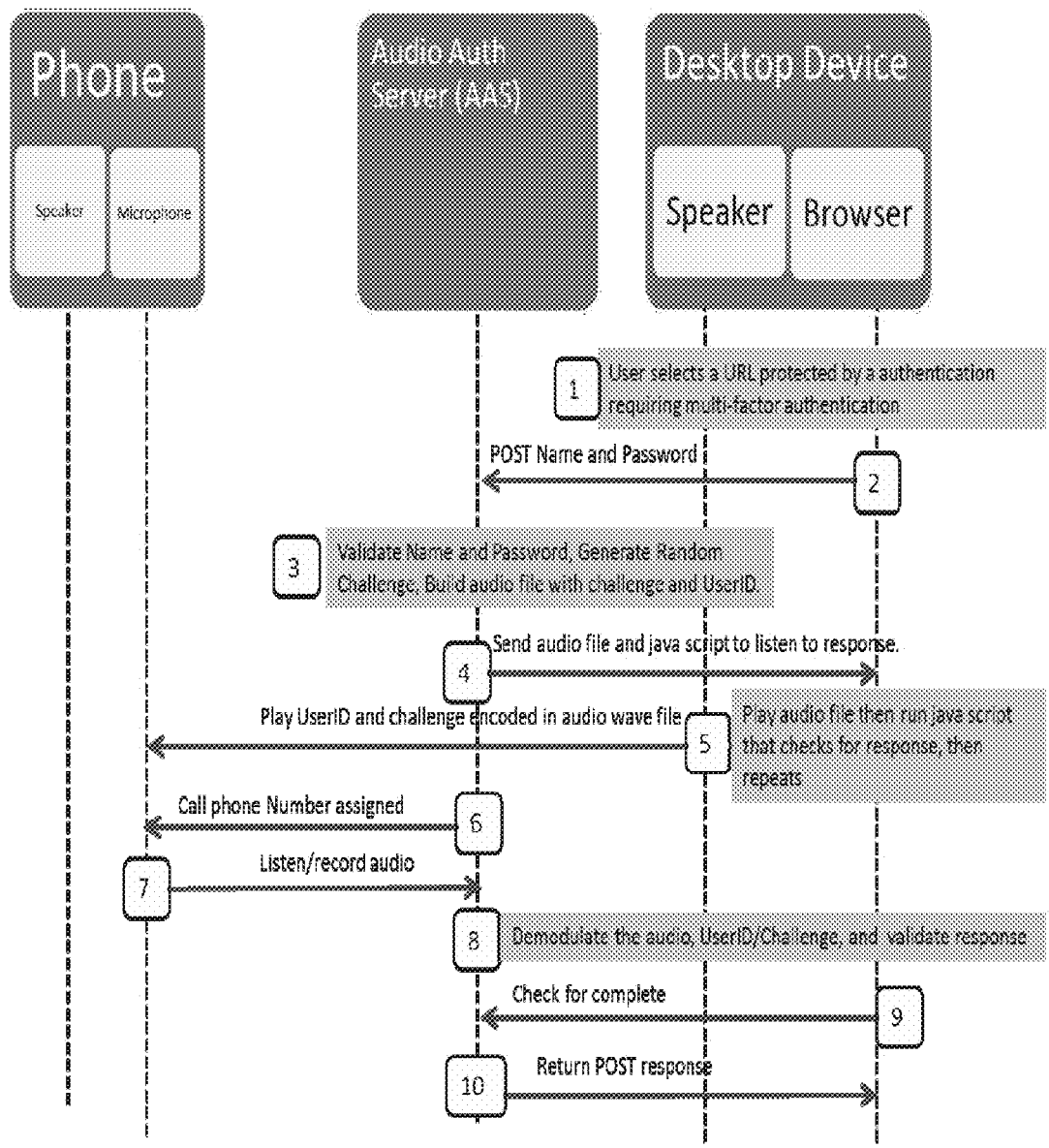

Reference is now made to the architecture presented in the FIG. 1B with reference to the processing of the FIG. 1E to describe other embodiments of the invention.

The user attempts to access a protected resource on a desktop device (laptop, or any processor-enabled device). In the example scenario presented in the FIG. 1E, the user uses a browser to access a link or supply an address for a protected resource. This causes a redirection of the request for the protected resource to the AAS and the user is prompted for a user name and password ("what the user knows" and part one of multifactor authentication). The second part of the multifactor authentication proceeds with reference to the FIG. 1E.

Initially, a phone number (or other device identifier) that is to be used by the AAS is preconfigured into the AAS by an administrator or, if policy permits, by the user. Again, the AAS is configured to use a secure communication protocol, such as SSL and/or TLS (others as discussed above).

At 1, the user selects a URL (or an address) associated with a protected resource controlled or managed by the AAS. The resource is configured to require multifactor authentication for access (the user name and password as one part, and as a second part what is described below with reference to this embodiment of the FIG. 1E).

At 2, the browser uses an HTML form to get the name and password from the user and sends the name and password to the AAS as a POST message.

At 3, the AAS validates the name and password (again, LDAP or other mechanisms). Next (assuming the name and password were validated), the AAS generates a challenge string. In an embodiment, the string is randomly generated by the AAS. Then, the challenge string and a user ID (acquired from validating the name and password) are encoded into an audio format to form an audio file or audio message. Any available approach can be used to encode the information into an audio format to form the audio message.

At 4, the AAS returns an HTML page to the browser having an application or script that executes within the context of the browser on the desktop device (JAVA®, custom application, custom script, etc.).

At 5, the application or script executes on the desktop device to play the audio message as an audio stream out of the speaker(s) interfaced to the desktop device. The application or script also checks for success (see 9 below). The playing of the audio message can continue until success is detected unless a time out is detected (such as manual user timeout, preconfigured number of iterations that the audio message plays, or a preconfigured elapsed period of time during which the audio message was playing).

At 6, the AAS calls the phone number (or contacts the device) that it is configured to call (or to contact) for multifactor authentication. The configuration can be based on the user ID, the protected resource that the user is attempting to authenticate to, and/or other policy directive(s).

At 7, the user answers the now ringing phone (or responds to the request for connection) based on the processing at 6 and places the answered phone in proximity to a speaker of the desktop device. The phone's (device's) microphone receiver relays the sound emanating from the desktop speaker and provides to the AAS during the call's connection between the phone/device and the AAS.

At 8, the ASS decodes the audio received over the connection with the phone/device. The AAS validates that the audio sent back to the AAS, via the connection to the phone, is the same audio message sent by the AAS to the browser at 4.

At 9, the application or script of the browser checks to see if a success message or authenticated session handle (session identifier) is received from the AAS (indicating the user now has an authentication session to access the protected resource via the browser of the desktop device). If there is no such success, the application or script of the browser repeats the processing associated with 4-5 and 7-8. If an authentication session handle is received, then processing continues to 10.

At 10, the AAS returns an authentication session handle (session identifier) to the browser for accessing the protected resource based on the original POST message sent at 2. The user can now access the protected resource.

It is noted that the description provided with respect to the FIGS. 1C-1E described a single-vendor environment; although it is to be noted that the approaches are equally as applicable to a multi-vendor environment by using a federation protocol, such as Security Assertion Markup Language (SAML), WS-Fed (Identity Foundation Specification), OAuth (Open Standards for authorization), OpenID (OpenID Foundation), and/or other open standard protocols. In these cases, any web service can make a single SAML or other federation-based request to the techniques of the invention and no knowledge of how the inventive techniques of the invention would be needed. So, multifactor authentication can be added to any web-based service that uses an open federation protocol.

Moreover, other described aspects of the embodiments presented in the FIGS. 1C-1E can be changed as well, without departing from the teachings presented herein.

For example, PKI does not have to be used; rather, any common key-based algorithm can be used. The devices need not be limited to a phone and a desktop device; in fact, any processor-enabled device can be used as either the mobile device and/or the desktop device (tablet, laptop, wearable processing device, and the like). The browser can be any customized application processing on the device from which the protected resource is initially requested. The PKI keys can be from a digital certificate with a specific root or parent. So, a company policy may just allow employees or partners to authenticate with the techniques presented herein. Still further, in some embodiments, the mobile application can operate in a "push" mode, such that the AAS pushes a message to the mobile device to start the mobile application on demand (so the mobile application need not, in each embodiment, be executing initially on the mobile device to perform the audio multifactor authentication techniques, since it can be initiated on the mobile device on demand when authentication is being processed—for example Apple's push notification service for IOS devices can be used for Apple devices to initiate the mobile application). This same "push" approach can also be used to set the keys or secrets on the mobile device that the mobile application uses to sign, and optionally encrypt, the audio message (so no pre-registration and acquisition of keys or secrets are needed in each embodiment presented, instead a dynamic key or secret delivery mechanism via the AAS can be deployed).

One now appreciates how multifactor authentication can be based on audio to provide a proximity-based guarantee that a user requesting authentication is in proximity to a device from which access is being requested of a protected enterprise resource. The proximity is only limited by the tolerance of the devices to detect, via microphones, audio messages being played or relayed by other devices, via speakers.

These embodiments presented with the FIGS. 1A-1E and other embodiments of the invention are now discussed with reference to the FIGS. 2-4.

Figure 2:
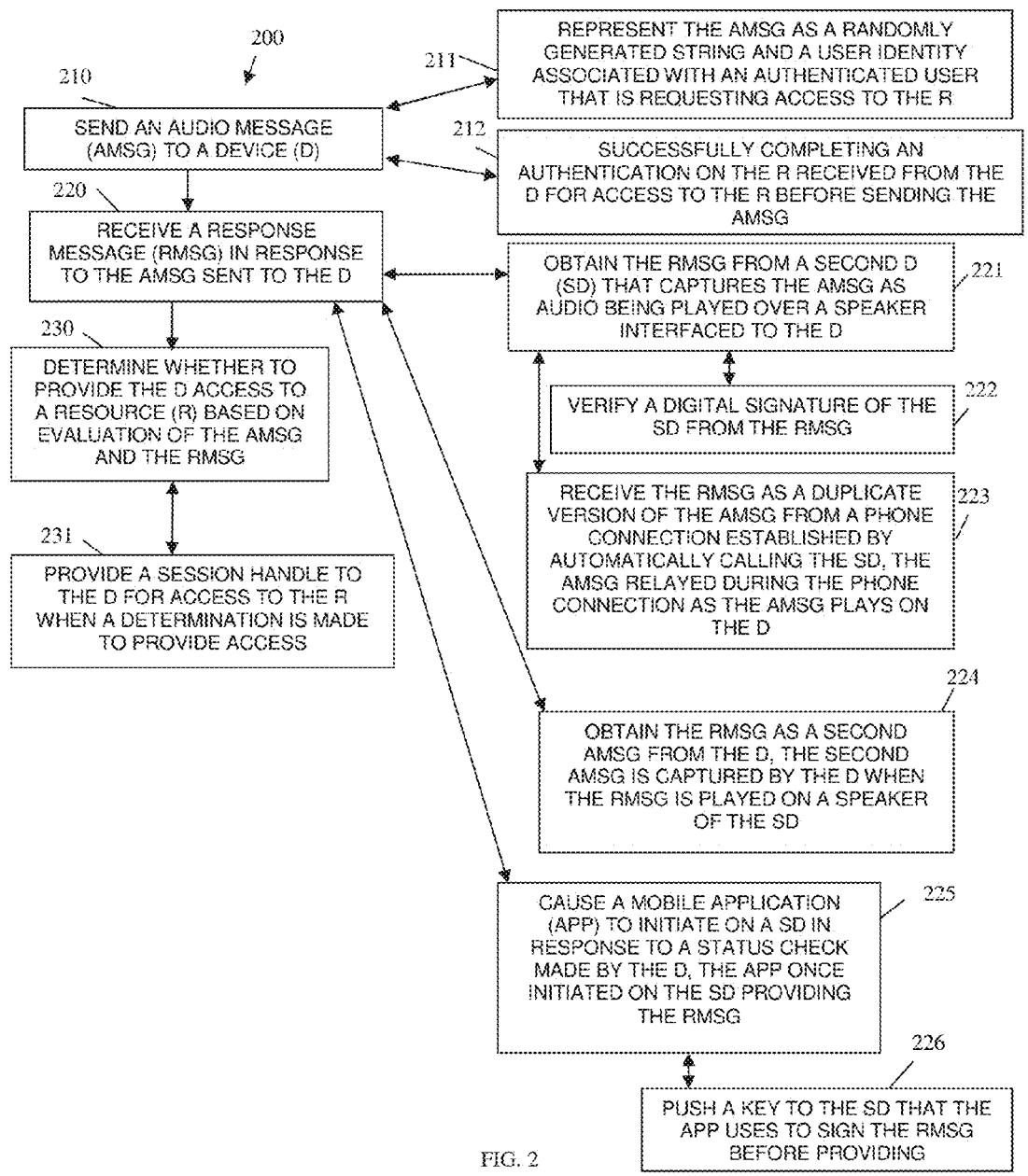
FIG. 2 is a diagram of a method proximity-based authentication, according to an example embodiment.

FIG. 2 is a diagram of a method 200 proximity-based authentication, according to an example embodiment. The method 200 is implemented as one or more software modules (herein after referred to as "server authentication agent"). The server authentication agent includes executable instructions that are implemented, programmed, and resides within memory and/or a non-transitory machine-readable storage media; the executable instructions execute on one or more processors of a device and have access to one or more network connections associated with one or more networks. The networks may be wired, wireless, or a combination of wired and wireless.

In an embodiment, the server authentication agent resides on the AAS and represents the processing depicted and described above with reference to the discussion of the FIGS. 1A-1E.

At 210, the server authentication agent sends an audio message to a device. This is done in response to the device providing a first factor authentication of a user that is requesting access to a protected resource, which the server that executes the server authentication agent controls access to. In an embodiment, this device is the desktop device described above with reference to the FIGS. 1A-1E.

According to an embodiment, at 211, the server authentication agent represents the audio message as a randomly generated string and a user identity associated with an authenticated user (achieved during the first factor authentication), who is requesting access to the protected resource. The random generation of the string prevents reproduction of the string. Also, the message may include a cryptographic or digital signature to prevent modification of the random string or the user identity. Moreover, the string is the challenge string discussed above with reference to the FIGS. 1C-1D.

So, in an embodiment at 212, the server authentication agent sends the audio message after completing a first-factor authentication on a request initiated by the user and received from the device for access to the protected resource.

At 220, the server authentication agent receives a response message in response to the audio message that was sent to the device at 210. This response message can be received from the device (FIG. 1C) or from a second device (FIGS. 1D-1E).

For example, at 221, the server authentication agent obtains the response message from a second device that captures the audio message as audio being played over a speaker interfaced to the device (FIG. 1C (mobile device) or 1D (landline phone)).

In an embodiment of 221 at 222, the server authentication agent verifies a digital signature of the second device from the response message (FIGS. 1C-1D).

In another case of 221 at 223, the server authentication agent receives the response message as a duplicate version of the audio message from a phone connection established by automatically calling the second device. The audio message relayed during the phone connection as the audio message plays on the device (FIG. 1E).

It is noted that the response message in the embodiments of 221-222 does not have to be in an audio format (although in some cases it can be), since the second device is directly sending the response message for second factor authentication through the server authentication agent via a secure network connection (such as SSL or TLS). In the embodiment of 223, the response message is received in an audio format since it is a relayed version of the original audio message being played by the device.

In another case of 220 and at 224, the server authentication agent obtains the response message as a second audio message from the device. The second audio message is captured by the device when played on a speaker of the second device (FIGS. 1C and 1D). It is noted that the server authentication agent does not have to directly receive the audio message from the device but it originates from the device (FIG. 1E duplicate version captured by the landline phone from the speaker interfaced to the device and relayed during a phone connection to the server executing the server authentication agent). The FIG. 1D depicts an embodiment where the device directly sends the response message to the server authentication agent (in an audio format and received from a microphone of the device as the response message plays on a speaker of the second device).

According to an embodiment, at 225, the server authentication agent causes a mobile application to "wake up" and initiate on the second device. This is done in response to a status check made by the device after the first factor authentication was requested by the device (FIG. 1D). The mobile application once initiated on the second device provides the response message (FIGS. 1C-1D).

In an embodiment of 225 at 226, the server authentication agent pushes a key to the second device that the mobile application uses to sign the response message before providing the response message to the server authentication agent. So, the mobile device may not possess the means to achieve the second factor authentication on its own even with the mobile application; rather, a needed key is dynamically pushed to the mobile device each time authentication is being requested and the key can be random, such that it is not reproducible for a second iteration of authentication with the server authentication agent.

At 230, the server authentication agent determines whether to provide access to the protected resource based on evaluation of the audio message and the response message. So, the server authentication agent knows the original audio message that it generated and uses that in connection with the response message to make a determination as to whether the second factor authentication it to be deemed successful, such that access to the protected resource is to be granted. (See description of the FIG. 1C (device provides the response message as a modified version of the original audio message provided as audio from the speaker of the second device), FIG. 1D (second device provides the response message based on decoding, signing, and optionally, encrypting the original audio message, the response message communicated to the server authentication agent via a secure connection from the second device), and the FIG. 1E (the second device (landline phone) relays the response message as a duplicate version of the original audio message as the device plays the original audio message over a speaker of the device.)

According to an embodiment, at 231, the server authentication agent provides a session identifier or handle back to the device for access to the protected resource when a determination is made (based on the evaluation at 230) to provide/grant access.

Figure 3:
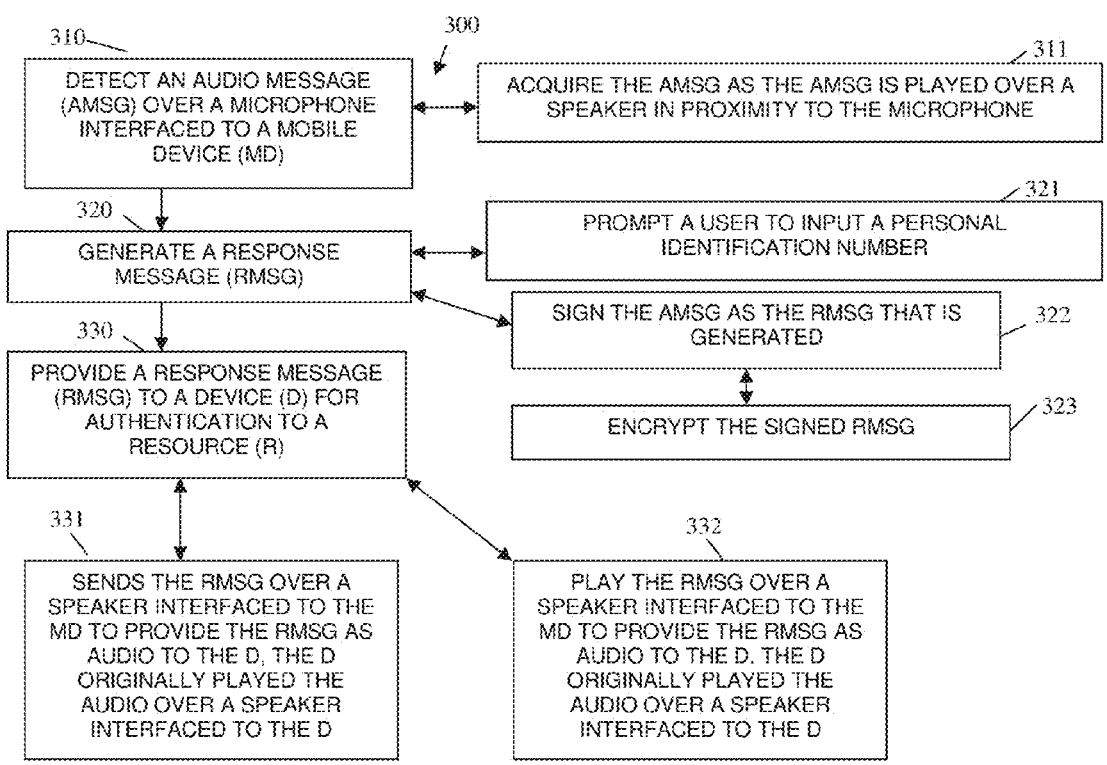
FIG. 3 is a diagram of another method for proximity-based authentication, according to an example embodiment.

FIG. 3 is a diagram of another method for proximity-based authentication, according to an example embodiment. The method 300 is implemented as one or more software module(s) (herein after referred to as "mobile device authentication agent"). The one or more software module are represented as executable instructions that are implemented, programmed, and resides within memory and/or a non-transitory machine-readable storage medium; the executable instructions execute on one or more processors of a device and have access to one or more network connections associated with one or more networks. The networks may be wired, wireless, or a combination of wired and wireless.

In an embodiment, the mobile device authentication agent is the mobile application of the mobile device described above with reference to the FIGS. 1C-1D and 2.

At 310, the mobile device authentication agent detects an audio message over a microphone interfaced to the mobile device that executes the mobile device authentication agent (FIGS. 1C-1D).

In an embodiment, at 311, the mobile device authentication agent acquires the audio message as the audio message is played over a speaker in proximity to the microphone (FIGS. 1C-1D). The geographical distance of the proximity is based on the tolerance level of the microphone and the detected volume of the audio message played over the speaker.

At 320, the mobile device authentication agent generates a response message in response to receipt of the audio message. In an embodiment, the response message is a modified version of the original captured audio message and the audio message includes a challenge string and a user ID for an authenticated user (authenticated during a first-factor authentication); the challenge string and user ID included in the original audio message produced by the server authentication agent of the FIG. 2 and also described in the FIGS. 1C-1D.

According to an embodiment, at 321, the mobile device authentication agent prompts the user to input a PIN or other key into an interface associated with the mobile device authentication agent on the mobile device. This can add a level of security to ensure an automated agent or unauthorized user is making a request for multifactor proximity-based authentication. A policy can be evaluated by the mobile device authentication agent to determine if the key or PIN is required of the user. Moreover, the policy can be dynamically changed via the server authentication agent of the FIG. 2 by pushing updates or new policies to the mobile device authentication agent on the mobile device.

In another case, at 322, the mobile device authentication agent signs the audio message as the response message that is generated. This was discussed above with reference to the FIGS. 1C-1D.

In an embodiment of 322 and at 323, the mobile device authentication agent encrypts the signed response message as well perhaps using a different key from what was used with the signature.

At 330, the mobile device authentication agent provides the response message to the device. This is done for purposes of a second factor authentication of the user requesting access to a protected resource.

In an embodiment, at 331, the mobile device authentication agent sends the response message in audio format for playing over a speaker interfaced to the mobile device (the speaker in proximity to a microphone interfaced to the device). This is done by providing the response message as audio to the device. Again, the device originally played the audio message as audio over a speaker interfaced to the device and that speaker was in proximity to the microphone of the mobile device (FIG. 1C).

In another case, at 332, the mobile device authentication agent sends the response message to the device over a network connection. Here, the device is the server of the FIG. 2 that executes the server authentication agent. The device (server) provides the authentication to a second device (desktop device of the FIGS. 1A-1E) that originally played the audio message as audio over a speaker, in proximity to the microphone of the mobile device, which is interfaced to the second device.

Figure 4:
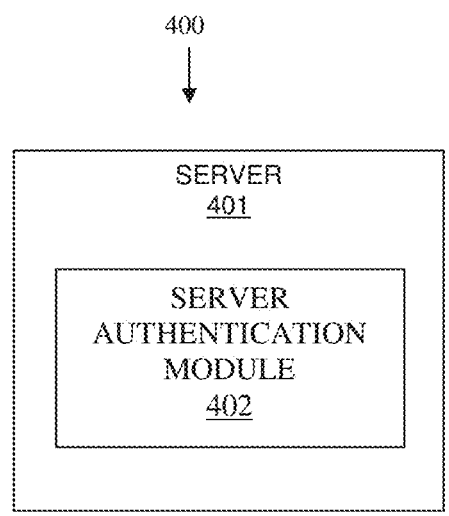
FIG. 4 is a diagram of a proximity-based authentication system, according to an embodiment.

FIG. 4 is a diagram of a proximity-based authentication system 400, according to an embodiment. Various components of the proximity-based authentication system 400 are software module(s) represented as executable instructions, which are programmed and/or reside within memory and/or non-transitory computer-readable storage media for execution by one or more devices. The components and the devices have access to one or more network connections over one or more networks, which are wired, wireless, or a combination of wired and wireless.

According to an embodiment, the proximity-based authentication system 400 implements, in whole or in part and inter alia, various features of the FIGS. 1A-1E and 2-3.

The proximity-based authentication system 400 includes a server 401 and a server authentication module 402.

The server 401 includes one or more processors, memory, and non-volatile storage. In an embodiment, the server 401 is the AAS depicted and discussed above with reference to the FIGS. 1A-1E. The server 401 is capable of establishing multiple connections to multiple networks, such as cellular networks, Wi-Fi networks, Ethernet networks, and the like.

The server 401 includes a server authentication module 402. The server authentication module 402 is implemented as one or more software modules having executable instructions that execute on the one or more processors of the server 401. In an embodiment, the server authentication module 402 when executed performs the processing depicted in the FIGS. 1A-1E and 2.

The server authentication module 402 is adapted (configured) to: i) generate an audio message; ii) provide a script (or application) for execution on a device (the device configured to play an audio message over a speaker interfaced to the device); iii) validate a response message received from at least one of: the device (depicted in the FIG. 1C) and a second device (depicted in the FIG. 1D); and iv) provide a determination as to whether a user interacting with the device is to be given access to a resource requested by the user (FIGS. 1C-1E).

According to an embodiment, the device is a desktop device and the second device is one of: a cellular phone (FIG. 1C-1D) and a landline phone (FIG. 1E).

In an embodiment, the response message is at least one of: encrypted and signed by the second device (FIGS. 1C and 2) and a duplicated version of the audio message captured by the server authentication module 402 during a phone connection with the second device as the device plays the audio message over the speaker (FIGS. 1E and 2).

One now fully appreciates how multiple devices and audio can be used to achieve multifactor authentication against a user requesting access to a protected resource. Such novel and proximity-based multifactor authentication has application in a variety of areas, such as, but not limited to, access to financial assets, financial transaction processing, access to confidential operations or information, and the like.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   authenticating, by a server through a first authentication, a request to access a resource, the request that is sent from a first device by a user, and the resource requiring multifactor authentication for successful access by user, wherein authenticating further includes authenticating the user for a first factor of the multifactor authentication as the first authentication;
   sending, by the server, an audio message to the first device operated by the user in response to successfully authenticating the user through the first factor of the multifactor authentication to access the resource, wherein sending further includes creating the audio message as a portion of the second factor processed for the multifactor authentication required for accessing the resource;
   receiving, by the server, a response message in response to the audio message that was sent to the first device, wherein receiving, by the server, further includes receiving the response message automatically and without any interaction from the user and automatically sending from a second device operated by the user the response message, and wherein receiving further includes automatically capturing, by the second device, the response message that is to be sent to the server as the first device plays the audio message that originated from the server without any action by the user as output through speakers associated with the first device, wherein automatically capturing further includes capturing, by the second device, the audio message played through the speakers as the response message that is automatically sent by the second device to the server, wherein the response message represents a second portion of the second factor processed for the multifactor authentication required for accessing the resource; and
   determining, by the server, whether to provide the first device access to the resource in a second authentication by evaluating the audio message as the first portion of the multifactor authentication against the response message as the second portion of the multifactor authentication for the second authentication, and wherein determining further includes verifying a digital signature of the second device from the response message in a third authentication when determining whether to provide the first device access to the resource, and wherein determining further includes pushing a key, by the server, to the second device that a mobile application executing on the second device processes for signing the response message before the second device automatically sends the response message to the server.

2. The method of claim 1, wherein sending further includes representing the audio message as a randomly generated string and a user identity associated with the user that is requesting access to the resource.

3. The method of claim 1, wherein determining further includes providing a session handle to the first device for access to the resource when a determination is made to provide access based on the first authentication and the second authentication.

* * * * *